United States Patent [19]

Stryker

[11] 3,959,004

[45] May 25, 1976

[54] PROCESS FOR PRODUCING LOW POROSITY CEMENT

[75] Inventor: Lynden J. Stryker, Mt. Pleasant, S.C.

[73] Assignee: Westvaco Corporation, New York, N.Y.

[22] Filed: Apr. 21, 1975

[21] Appl. No.: 570,014

[52] U.S. Cl. .................................. 106/93; 106/89; 106/90; 106/104; 106/117; 106/118; 106/119; 106/123 LC; 166/293
[51] Int. Cl.² .................. C04B 7/35; C04B 7/353
[58] Field of Search ............... 106/90, 93, 314, 313; 166/293, 294

[56] References Cited
UNITED STATES PATENTS

| | | | |
|---|---|---|---|
| 2,646,360 | 7/1953 | Lea | 106/90 |
| 3,689,294 | 9/1972 | Brunauer | 106/90 |

OTHER PUBLICATIONS

Orchard, D. F., *Concrete Technology*, Vol. 1, Properties of Materials (3rd. ed.), Pub. N.Y., Wiley and Sons, (1973), pp. 58–59, 66, 70–73.

Hansen, W. C., "Interactions of Organic Compounds in Portland Cement Pastes", J. Materials 5, (4), Dec. 1970, pp. 842–855.

*Primary Examiner*—Helen M. McCarthy
*Attorney, Agent, or Firm*—Richard L. Schmalz; Ernest B. Lipscomb, III

[57] ABSTRACT

A method is disclosed for making low-porosity, free-flowing cement pastes with extended set times, improved workability and reduced expansion due to alkali aggregate reactions, by combining hydraulic cements, especially Portland-type cements, ground without gypsum with from 0.1% to about 1.0% of an alkali or alkaline earth lignosulfonate or sulfonated lignin, combining 20% to 40% of water with 0.1% to 2.0% of an alkali bicarbonate, and thereafter mixing together the combined cement and lignin with the combined water and alkali bicarbonate. As an alternate embodiment of this process, the alkali or alkaline earth lignosulfonate or sulfonated lignin may be added to the water-bicarbonate rather than blended directly with the cement. These low-porosity pastes when mixed with aggregates produce mortars and concretes that have extended set times and are very workable during processing.

10 Claims, No Drawings

3,959,004

PROCESS FOR PRODUCING LOW POROSITY CEMENT

BACKGROUND OF THE INVENTION

1. Field of the Invention

This invention relates to a method for making low-porosity cement paste. More particularly, this invention relates to a method for producing low porosity cement from a gypsum-free hydraulic cement which includes alkali bicarbonates and lignosulfonates and follows a particular mixing sequence to give a cement paste having an extended set time and other benefits.

Cements are produced by calcining suitable raw materials, generally a mixture of calcareous and argillaceous materials, to produce a sintered "clinker". Portland types are by far the most important cements in terms of quantity produced. The clinker is conventionally mixed with small amounts of gypsum, i.e., up to about 9%, and ground, usually in some type of ball mill, to a finely divided state having a relatively large surface area to yield the finished cement.

The ground clinker containing gypsum is mixed with the proper amount of water to form a paste. Properly made cement pastes set within a few hours and then harden slowly. Cement pastes are combined with aggregates, either fine aggregates or sand to produce mortars or larger aggregates as gravel, stone and the like to produce concrete. The paste acts as the cementing material and its composition has a decisive effect on the strength and other properties of the resultant mortar or concrete.

One of the main factors that determine the properties of hardened cement pastes and, consequently of mortar and concrete, is the water-to-cement ratio of the fresh mix. The lower the water-to-cement ratio the higher the strength, lower the shrinkage, and better the frost and corrosion resistance. The desirability of having a low water-to-cement ratio, the conventional practice being normally between about 0.4 and 0.6, is to obtain a concrete or mortar having minimum shrinkage and increased ultimate strength. However, simply lowering the water-to-cement ratio of conventional portland cements is not the answer. The fact that a decrease of the water content improves the properties of the hardened concrete can be used only to a limited degree as a decrease of the water content results simultaneously in a deterioration of the workability and shortening of the setting time of the concrete mix. The requirements for a sufficient workability of the fresh concrete mix are the reasons for the fact that the water content of concrete mixes used in practical applications lies far above the amount that is needed for complete hydration of cement. While the amount of water needed for complete hydration of cement is about 22–23%, the lowest amount of water used in conventional concrete practice lies in the vicinity of 40% and usually ranges between 45% and 80%.

Even through the use of conventional water reducers (mainly lignosulfonates from spent sulfite pulping liquors) a water reduction of only about 10% of the water added is possible. The water remaining in the concrete mix made from ordinary cement is still far above the requirements needed for complete hydration of the cement. Thus, if the water content could be further reduced without deterioration of the workability or without introducing other detriments, a significant gain in strength and an improvement of some other properties of the hardened concrete could be reached.

2. The Prior Art

Efforts to produce low porosity cements by reduction of water-to-cement ratio have been long attempted. For example, U.S. Pat. No. 2,174,051 to Winkler teaches that an increase in strength is obtained with a low water-to-cement ratio and that certain organic compounds such as tartaric acid, citric acid and the like may be added to regulate the setting time.

U.S. Pat. No. 2,374,581 to Brown teaches that small amounts of tartaric acid, tartartes and bicarbonates may be added to ordinary (gypsum containing) portland cement at conventional water-to-cement ratios to retard the rate of set at high temperatures in the cementing of oil wells.

U.S. Pat. No. 2,646,360 to Lea teaches that an alkali metal or alkaline earth metal lignin sulfonate and an alkali metal salt of an inorganic acid (e.g., sodium carbonate) may be added to a gypsum containing cement slurry to reduce water loss and thus the amount of water initially needed.

U.S. Pat. No. 3,118,779 to Leonard, on the other hand, teaches that sodium bicarbonate when added to a portland cement-Type III (containing gypsum) without lignin being present acts as an accelerator.

U.S. Pat. No. 3,689,296 to Landry teaches that formaldehyde modified calcium lignosulfonates may be used in portland cements to replace all or part of the gypsum usually added and the amount of water required for a mix of a given degree of fluidity is reduced.

U.S. Pat. No. 3,689,294 to Braunauer reflects more recent effort to produce low porosity cements by grinding portland-type cements without gypsum to a specific surface area between 6,000 – 9,000 Blaine (cm.$^2$/gm.) and mixing with alkali or alkaline earth lignosulfonate, alkali carbonate and water.

U.S. Pat. No. 3,782,984 to Allemand et al. teaches that the addition of 0.5% to 5% of alkali metal acid bicarbonates to portland-type cements accelerates the setting time.

The French publication *Les Adjuvants Du Ciment* edited by Albert Joisel (Soisy, France 1973 published by the author) at page 102 teaches that sodium bicarbonate in ordinary portland cement is a retarder and again at page 132 that sodium bicarbonate may be added to portland cement with gypsum in the usual way.

The above described prior art is intended as exemplary and not inclusive of all low porosity cement art.

It is, therefore, a general object of this invention to provide a process for making an improved low porosity, free-flowing cement paste.

Another object of this invention is to provide an improved low porosity, free-flowing cement with reduced expansion due to alkali aggregate reactions by including sodium bicarbonate as an additive.

A further object of this invention is to provide a process for mixing cement, water and adjuvants to obtain a low porosity, free-flowing cement paste having an extended set time and improved workability.

Other objects, features and advantages of this invention will become evident from the following detailed description of the invention.

SUMMARY OF THE INVENTION

A process is disclosed for making low-porosity, free-flowing cement pastes which includes the particular mixing sequence of combining ground hydraulic cement, in particular, Portland cements without gypsum with from 0.1% to about 1.0% of an alkali or alkaline earth lignosulfonate or sulfonated lignin, combining 20% to 40% of water with 0.1% to 2.0% of alkali bicarbonate, and thereafter mixing together the combined hydraulic gypsum-free cement and lignin with the combined water and sodium bicarbonate to give cement pastes having extended set times and increased workability. In an alternate embodiment, the lignin, bicarbonate and water are mixed together prior to combining with the ground cement. The process also shows the desirability of using alkali bicarbonates in a process for making low porosity cement rather than alkali carbonates.

DETAILED DESCRIPTION OF THE INVENTION

The cements to which this invention is applicable are "hydraulic cements". Hydraulic cements include, but are not limited to, the Portland cements, the natural cements, the white cements, the aluminous cements, the grappies cements, the hydraulic limes, and the pozzolanic cements including those derived from industrial slags. The hydraulic cement which is most widely used is Portland cement. Clinkers of the above-described types are ground to 3,500 cm.$^2$/gm. and finer, e.g., up to 9,000 cm.$^2$/gm.

To assist in obtaining the desired fineness, it is common practice in the cement industry to employ grinding aids which increase the efficiency of the grinding operations. Satisfactory grinding aids include, among others, water-soluble polyols such as ethylene glycols, polyethylene glycols, as well as, other water-soluble diols. The grinding aids are generally added to the clinker in an amount of from 0.005% to 0.1% based on weight of cement, and the ground cement may include a pack set inhibitor. Additional examples of grinding aids may be found in U.S. Pat. Nos. 3,615,785 and 3,689,294. Although grinding aids are typically used to make the cement, they do not form a part of the present invention.

The process of the present invention thus starts with a ground hydraulic cement without gypsum. Using the process of this invention, low porosity mortars and concretes may be made from the cement pastes. As used herein, the term "low porosity" cement is defined as a free-flowing and workable cement paste having a water-to-cement (w/c) ratio of below 0.40 down to about 0.2, with workable mortars and concrete preferably from 0.35 down to 0.25 w/c ratio. An alkali or alkaline earth lignosulfonate or alkaline earth sulfonated lignin is combined with either the ground cement or the mix water. A portion of the lignosulfonate or sulfonated lignin may be added to the cement and a portion added to the mix water. No essential differences in results are apparent wherever the lignosulfonate or sulfonated lignin is added. In any event, the amount of lignosulfonate or sulfonated lignin is from 0.1% to about 1.0%, preferably from 0.3% to about 0.8%, based on the weight of dry ground cement.

The lignosulfonates are obtained as byproducts from sulfite pulping of woody materials. The waste liquors from such pulping contain large quantities of lignin and lignin products in conjunction with other materials. The sulfonated lignins, on the other hand, are produced by reacting lignins obtained from alkali pulping, acid hydrolysis or other known recovery process with an inorganic sulfite, e.g., sodium sulfite, whereby sulfonate groups are added to the lignin. For use in this invention, any of the various water-soluble sulfonated lignins or lignosulfonates may be employed. It is preferable, however, to utilize sulfonated lignins which are free of carbohydrate materials. Sulfonated lignins obtained from reaction of sulfites with alkali lignin do not contain any appreciable amounts of these carbohydrates and consequently may be employed as is. The sulfonated lignins may be converted into water-soluble alkaline earth salts, and used as such, as disclosed in U.S. Pat. No. 2,141,570.

An alkali bicarbonate in the amount of 0.1% to 2.0%, preferably 0.7% to 1.5%, by weight based on the dry cement is employed. Sodium bicarbonate is preferred. It was found that when the alkali bicarbonate was added to the cement that an unexpected increase in set time and workability over the use of alkali carbonate is obtained at water-to-cement ratios below 0.4. Even more surprisingly, it was found that when the alkali bicarbonate is dissolved in the mix water, even more superior results with regard to control of set time and improved fluidity are obtained than when using other mixing sequences. The amount of water used is 20% to 40% by weight based on dry cement or a water-to-cement ratio (w/c) of 0.4 to 0.2. The manner in which the bicarbonate is combined with the water may vary. For example, the bicarbonate itself may be added, or soda may be added and carbonated.

Thus, the mixing sequence of this invention is to combine the alkali bicarbonate with the mix water prior to adding the water to the cement.

It may also be desirable in some cases to add a third component to the low porosity system to obtain substantial lengthening of the plastic period for mortars and concretes while still having adequate one-day compressive strengths. These components used in small amounts, for example, 0.1% – 0.2%, are primarily surfactants and conventional water reducer/set retarders. Anionic surfactants may include the sodium salt of sulfonated alkalidiphenyloxide, while nonionic surfactants include polyethylene glycol and the like. Materials of the water reducer/set retarder class include carbohydrates like wood molasses, sucrose, dextrose, and hydroxy acids like sodium gluconate. Typical air detraining agents, such as tributyl phosphate, may also be used to advantage in the low porosity systems.

This combination of additives and mixing sequence obviates the need to add gypsum and produces a free-flowing, workable, low-porosity cement paste having an extended and controllable set time. The superior results obtained utilizing the additives and process of the present invention are wholly unexpected in the making of low porosity cements in view of the prior art. As detailed hereinabove, each of the additives has been heretofore used in gypsum containing portland-type cements; but none of the products obtained by the prior art approaches the level of performance attained with low porosity cements made according to the present invention.

The practice of this invention may clearly be seen in the following examples.

EXAMPLE 1

This example is to illustrate the lengthened set time of cement paste made using an alkali bicarbonate rather than an alkali carbonate and to demonstrate the advantages of the particular mixing scheme of this invention compared to other mixing schemes using the same materials.

A Type I portland cement clinker ground to 5,075 cm.²/gm. (A.S.T.M. C-204) having the following analysis was used in this example:

based on the cement and the water-to-cement ratio was 0.25. The amount of alkali carbonate was adjusted to provide equivalent molar quantities of $CO_3^=$ in all examples.

TABLE I

COMPARISON OF ALKALI CARBONATES AND BICARBONATES AND THE EFFECT OF MIXING SEQUENCE ON THE PROPERTIES OF LP CEMENT PASTES

| Run No. | Mixing Sequence | Type Carbonate | % | Flow* | Setting Time (Min.) | Compressive Strength (p.s.i.) 1 Day | 7 Days |
|---|---|---|---|---|---|---|---|
| 1 | (C + LS + AC) + W | $Na_2CO_3$ | 1.26 | 4+ | 13 | 10,400 | 11,600 |
| 2 | (C + LS + AC) + W | $NaHCO_3$ | 1.0 | 4+ | 38 | 10,200 | 18,950 |
| 3 | (C + LS) + (AC + W) | $Na_2CO_3$ | 1.26 | 4+ | 23 | 10,100 | 13,450 |
| 4 | (C + LS) + (AC + W) | $NaHCO_3$ | 1.0 | 4+ | 143 | 9,800 | 16,700 |
| 5 | (C + LS + AC) + W | $K_2CO_3.1.5 H_2O$ | 1.97 | 4 | 12 | 10,900 | 13,500 |
| 6 | (C + LS + AC) + W | $KHCO_3$ | 1.19 | 4+ | 19 | 9,600 | 16,580 |
| 7 | (C + LS) + (AC + W) | $K_2CO_3.1.5 H_2O$ | 1.97 | 4+ | 20 | 10,800 | 14,300 |
| 8 | (C + LS) + (AC + W) | $KHCO_3$ | 1.19 | 4+ | 141 | 11,400 | 19,150 |

Note: *Arbitrary flow units, see explanation below and are those used throughout all the examples. The consistencies of the cement pastes shown in Table I are according to the following scale:
1. Paste barely plastic, moves with difficulty even when vibration is applied.
2. Paste plastic but not freely flowing - flows easily when vibration is applied.
3. Paste freely flowing, but thick, can be poured without vibration.
4. Paste easily flowing.

| | Clinker % |
|---|---|
| $SiO_2$ | 21.70 |
| $Al_2O_3$ | 6.06 |
| $Fe_2O_3$ | 2.51 |
| CaO | 67.5 |
| MgO | 0.99 |
| $Na_2O$ | 0.06 |
| $K_2O$ | 0.28 |
| Ignition Loss | 0.62 |
| Insoluble | 0.14 |

The changes in physical properties (set time being the most dramatic) of cement pastes using alkali carbonates and alkali bicarbonates using two mixing schemes are illustrated in Table I. The mixing scheme designation in Table I denotes mixing all of the components within a set of parentheses and then mixing with the next component or components. Runs Nos. 4 and 8, illustrating one embodiment of the process of the invention, designate blending the cement (C) with a sulfonated alkali lignin (LS), and mixing the alkali bicarbonate (AC) with water (W) and subsequently mixing them together. The odd numbered Runs compare using an alkali carbonate, while the remaining Runs illustrate other mixing sequences. The amount of sulfonated lignin was held constant at 0.45% by weight The results in Runs 4 and 8 of Table I demonstrate clearly the unexpected increases in set time for bicarbonate systems over carbonate systems and significant addition advantages to dissolving the bicarbonates in the water without significantly altering the other properties (flow and compressive strength).

EXAMPLE 2

This example again demonstrates the specific advantages of dissolving the alkali bicarbonate in the mix water and shows that the sulfonated lignin may be dry blended or dissolved in the mix water. In this example, a portion of the clinker from Example 1 was ground to a Blaine surface of 4,525 cm.²/gm. The water-to-cement ratio was 0.25 and the sulfonated lignin dosage 0.35%.

TABLE II

EFFECTS OF MIXING SEQUENCE ON THE PROPERTIES OF LP CEMENT PASTES

| Mixing Scheme | Type Carbonate | % | Flow | Setting Time (Min.) | Compressive Strength (p.s.i.) 1 Day | 7 Days |
|---|---|---|---|---|---|---|
| (C + LS + AC) + W | $NaHCO_3$ | 0.80 | 4+ | 32 | 9,200 | 17,250 |
| (C + AC) + (LS + W) | $NaHCO_3$ | 0.80 | 4+ | 36 | 10,700 | 18,350 |
| (C + LS) + (AC + W) | $NaHCO_3$ | 0.80 | 4+ | 98 | 10,800 | 17,100 |
| C + (LS + AC + W) | $NaHCO_3$ | 0.80 | 4+ | 96 | 10,500 | 19,200 |

The data in Table II clearly demonstrate that the sulfonated lignin may be added to either the mix water or dry blended with the cement without significantly altering the paste properties.

EXAMPLE 3

This example illustrates that ground cement with varying surface areas and from different sources other than Example 1 may be employed. Clinkers "B" and "C" are Type I portland cement clinkers from two different sources. The w/c = 0.25 in all cases.

TABLE III

EFFECTS OF DIFFERENT CLINKER AND SURFACE AREA ON LP CEMENT PASTE PROPERTIES

| Clinker | Surface Area Cm.²/gm. | Mixing Scheme | Flow | Setting Time (Min.) | Compressive Strength (p.s.i.) 1 Day | 7 Days |
|---|---|---|---|---|---|---|
| B[1] | 6,225 | (C + LS + AC) + W[2] | 4+ | 29 | 13,300 | 14,850 |

TABLE III-continued

EFFECTS OF DIFFERENT CLINKER AND SURFACE AREA ON LP CEMENT PASTE PROPERTIES

| Clinker | Surface Area Cm.$^2$/gm. | 12 Mixing Scheme | Flow | Setting Time (Min.) | Compressive Strength (p.s.i.) 1 Day | 7 Days |
|---|---|---|---|---|---|---|
| B[1] | 6,225 | (C + LS) + (AC + W) | 4 + | 58 | 13,200 | 15,900 |
| B[1] | 6,225 | C + (LS + AC + W) | 4 + | 56 | 13,900 | 16,500 |
| B[2] | 4,825 | (C + LS + AC) + W | 4 + | 45 | 11,200 | 16,250 |
| B[2] | 4,825 | (C + LS) + (AC + W) | 4 + | 78 | 10,700 | 17,250 |
| C[2] | 4,800 | (C + LS + AC) + W | 4 + | 73 | 10,300 | 12,800 |
| C[2] | 4,800 | (C + LS) + (AC + W) | 4 + | 135 | 10,500 | 14,450 |
| C[2] | 4,800 | C + (LS + AC + W) | 4 + | 127 | 10,100 | 12,200 |
| C[2] | 3,900 | (C + LS + AC) + W | 4 + | 58 | 9,400 | 14,450 |
| C[2] | 3,900 | (C + LS) + (AC + W) | 4 + | 180 | 8,900 | 13,050 |
| C[2] | 3,900 | C + (LS + AC + W) | 4 + | 170 | 8,300 | 11,850 |

Notes: [1] 0.55% sulfonated lignin and 1.0% NaHCO$_3$
[2] 0.50% sulfonated lignin and 1.0% NaHCO$_3$ Table III demonstrates that no essential differences are observed using clinkers from different sources or clinkers ground to different specific surface areas.

EXAMPLE 4

The use of alkali bicarbonates rather than alkali carbonates also improves the fluidity in cases where marginal fluidity occurs. The addition of the alkali bicarbonate to the mix water also gives improved flow. The examples in Table IV illustrate these points wherein 0.45% of sulfonated alkali lignin and an equimolar amount of CO$^=_3$ were used with ground clinker "A" and 0.50% sulfonated alkali lignin and an equimolar amount of CO$^=_3$ were used with ground clinker "B".

TABLE IV

FLOW ENHANCEMENT OF LP CEMENT PASTES WITH ALKALI BICARBONATES AND THE PREFERRED MIXING SEQUENCE

| Clinker | Surface Area Cm.$^2$/gm. | Mixing Sequence | Type Carbonate | Flow | Setting Time (Min.) | Compressive Strength (p.s.i.) 1 Day | 7 Days |
|---|---|---|---|---|---|---|---|
| A | 5,025 | (C + LS + AC) + W | Na$_2$CO$_3$ | 1–2 | 9 | 8,800 | 13,150 |
| A | 5,025 | (C + LS + AC) + W | NaHCO$_3$ | 4 | 35 | 9,700 | 18,000 |
| A | 5,025 | (C + LS) + (AC + W) | Na$_2$CO$_3$ | 2 | 20 | 10,200 | 14,050 |
| A | 5,025 | (C + LS) + (AC + W) | NaHCO$_3$ | 4 + | 49 | 7,500 | 19,550 |
| B | 5,325 | C + (LS + AC + W) | Na$_2$CO$_3$ | 3 | 13 | 11,400 | 13,500 |
| B | 5,325 | C + (LS + AC + W) | NaHCO$_3$ | 4 + | 59 | 12,500 | 13,350 | tz.1/49

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A method of making a gypsum-free, low porosity free-flowing cement paste which consists essentially of the following mixing sequence;
   a. combining hydraulic cement without gypsum ground to a fineness of from 3,500 to 9,000 cm.$^2$/gram with from 0.1% to about 1.0% of alkali or alkaline earth lignosulfonate or sulfonated lignin,
   b. combining 20% to 40% of water with 0.1% to 2.0% of an alkali bicarbonate, and
   c. thereafter mixing together the combined materials of steps (a) and (b), all percentages based on dry weight of ground cement.

2. The method according to claim 1 wherein said lignin is present in an amount from 0.3% to 0.8%.

3. The method according to claim 1 wherein said alkali bicarbonate is present in an amount from 0.7% to 1.5%.

4. The method according to claim 1 wherein said alkali bicarbonate is sodium bicarbonate, said lignin is a sulfonated alkali lignin and said hydraulic cement is a Portland cement.

5. A method of making a gypsum-free, low porosity, free-flowing cement paste which consists essentially of;
   a. admixing from 0.1% to about 1.0% of alkali or alkaline earth lignosulfonate or sulfonated lignin, from 0.1% to about 2.0% of an alkali bicarbonate with 20% to 40% of water, all percentages based on the dry weight of ground cement, and then
   b. mixing the materials of step (a) with hydraulic cement without gypsum ground to a Blaine fineness of from 3,500 to 9,000 cm.$^2$/gm.

6. The method accordng to claim 5 wherein said lignin is present in an amount from 0.3% to 0.8%.

7. The method according to claim 5 wherein said alkali bicarbonate is present in an amount from 0.7% to 1.5%.

8. The method according to claim 5 wherein said alkali bicarbonate is sodium bicarbonate, said lignin is a sulfonated alkali lignin, and said hydraulic cement is a Portland cement.

9. A method of making a gypsum-free, low porosity, free-flowing cement paste which consists essentially of the following mixing sequence;
   a. combining hydraulic cement ground to a Blaine fineness of from 3,500 to 9,000 cm.$^2$/gm. with a portion of alkali or alkaline earth lignosulfonate or sulfonated lignin,
   b. combining 20% to 40% of water with 0.1% to 2.0% of an alkali bicarbonate and the remaining portion of said lignin from step (a), the total amount lignin in steps (a) and (b) being from 0.1% to about 1.0%, and
   c. thereafter mixing together the combined materials of steps (a) and (b), all percentages based on dry weight of ground cement.

10. A method of making a gypsum-free, low porosity, free-flowing cement paste which consists essentially of;
   a. admixing a portion of alkali or alkaline earth lignosulfonate or sulfonated lignin, from 0.1% to about 2.0% of an alkali bicarbonate with 20% to 40% of water, and then
   b. mixing the remaining portion of said lignin from step (a) with hydraulic cement without gypsum ground to a Blaine fineness of from 3,500 to 9,000 cm.$^2$/gm., the total amount of lignin in steps (a) and (b) being from 0.1% to about 1.0%, all percentages based on the dry weight of ground cement, and then
   c. mixing the materials of steps (a) and (b) together.

* * * * *

UNITED STATES PATENT OFFICE
CERTIFICATE OF CORRECTION

PATENT NO. : 3,959,004
DATED : May 25, 1976
INVENTOR(S) : Lynden J. Stryker

It is certified that error appears in the above-identified patent and that said Letters Patent are hereby corrected as shown below:

Column 3, line 35, "0.1%" should be --1.0%--.

Column 7, Table IV, last line, delete "tz.1/49".

Signed and Sealed this
Tenth Day of August 1976

[SEAL]

*Attest:*

RUTH C. MASON
*Attesting Officer*

C. MARSHALL DANN
*Commissioner of Patents and Trademarks*